(12) United States Patent
Shi et al.

(10) Patent No.: US 12,058,571 B2
(45) Date of Patent: Aug. 6, 2024

(54) MOBILITY ENFORCEMENT IN CONNECTED WIRELESS STATE

(71) Applicant: ZTE Corporation, Guangdong (CN)

(72) Inventors: Xiaojuan Shi, Guangdong (CN); He Huang, Guangdong (CN); Jing Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 429 days.

(21) Appl. No.: 17/374,559

(22) Filed: Jul. 13, 2021

(65) Prior Publication Data

US 2021/0345195 A1 Nov. 4, 2021

Related U.S. Application Data

(63) Continuation of application No. PCT/CN2019/071534, filed on Jan. 14, 2019.

(51) Int. Cl.
*H04W 36/00* (2009.01)
*H04W 12/037* (2021.01)
*H04W 12/043* (2021.01)
*H04W 12/106* (2021.01)
(Continued)

(52) U.S. Cl.
CPC ..... *H04W 36/0069* (2018.08); *H04W 12/037* (2021.01); *H04W 12/043* (2021.01); *H04W 12/106* (2021.01); *H04W 28/06* (2013.01); *H04W 36/0038* (2013.01); *H04W 36/32* (2013.01)

(58) Field of Classification Search
CPC .......... H04W 36/0069; H04W 12/037; H04W 12/043; H04W 12/106; H04W 28/06; H04W 36/0038; H04W 36/32; H04W 12/033; H04W 36/0058; H04W 36/08; H04W 76/15; H04W 76/27; H04W 80/02; H04W 12/03; H04W 12/10; H04W 36/18
See application file for complete search history.

(56) References Cited

U.S. PATENT DOCUMENTS

| 9,271,290 | B2 | 2/2016 | Pelletier et al. |
| 2015/0327094 | A1 | 11/2015 | Lee et al. |
| 2016/0066203 | A1 | 3/2016 | Yoon |

(Continued)

FOREIGN PATENT DOCUMENTS

| CN | 103238368 A | 8/2013 |
| CN | 106797376 A | 5/2017 |

(Continued)

OTHER PUBLICATIONS

KIPO, Notice of Allowance for Korean Application No. 10-2021-7025694, mailed on Jul. 5, 2023, 9 pages with unofficial translation.

(Continued)

*Primary Examiner* — Mazda Sabouri
(74) *Attorney, Agent, or Firm* — Perkins Coie LLP

(57) ABSTRACT

Techniques to achieve near zero millisecond mobility of wireless terminals are described. In one example method, a wireless terminal receives a radio resource control message from a source node. The message indicates the use of a simultaneous connectivity mobility of the wireless terminal during a mobility procedure from the source node to a target node. The wireless terminal performs the mobility procedure based on the control message.

18 Claims, 8 Drawing Sheets

(51) Int. Cl.
*H04W 28/06* (2009.01)
*H04W 36/32* (2009.01)

(56) References Cited

U.S. PATENT DOCUMENTS

| | | | | |
|---|---|---|---|---|
| 2016/0088527 | A1* | 3/2016 | Wolff | H04W 36/0055 455/436 |
| 2016/0135095 | A1* | 5/2016 | Wu | H04W 28/06 370/328 |
| 2016/0242193 | A1 | 8/2016 | Hong et al. | |
| 2018/0213452 | A1* | 7/2018 | Kim | H04W 36/0088 |
| 2018/0227805 | A1* | 8/2018 | Jang | H04W 72/1215 |
| 2019/0037635 | A1* | 1/2019 | Guo | H04W 76/27 |
| 2019/0253945 | A1* | 8/2019 | Paladugu | H04W 76/27 |
| 2019/0349822 | A1* | 11/2019 | Kim | H04W 28/0864 |
| 2020/0022046 | A1 | 1/2020 | Wang et al. | |
| 2020/0120552 | A1 | 4/2020 | Yang et al. | |
| 2021/0204209 | A1* | 7/2021 | Kim | H04W 52/0229 |

FOREIGN PATENT DOCUMENTS

| | | |
|---|---|---|
| CN | 107371208 A | 11/2017 |
| CN | 108990116 A | 12/2018 |
| EP | 3070975 A1 | 9/2016 |
| EP | 3425947 A1 | 1/2019 |
| KR | 10-2009-0112734 A | 10/2009 |
| WO | 2008/097631 A2 | 8/2008 |
| WO | WO2018171738 A1 | 9/2018 |

OTHER PUBLICATIONS

EPO, Communication pursuant to Article 94(3) EPC for European Application No. 19909837.7, mailed on Sep. 5, 2023, 8 pages.
CATT, "NR mobility enhancement on dual connectivity," 3GPP TSG RAN WG2 #97bis, Spokane, USA, R2-1703099, Apr. 3-7, 2017, 3 pages.
Huawei et al., "DRB configuration and switch in dual connectivity," 3GPP TSG RAN WG2 #87, Dresden, Germany, R2-143343, Aug. 18-22, 2014, 5 pages.
Huawei et al., "SgNB to MgNB reconfiguration for 0ms interruption handover," 3GPP TSG RAN WG2 #98, Hangzhou, China, R2-1704853, May 15-19, 2017, 4 pages.
European Search Report for EP Patent Application No. 19909837.7, dated Dec. 2, 2021, 14 pages.
Ericsson, et al., "Way Forward on CU-DU Separation," 3GPP TSG-RAN WG2 Meeting #104, R2-1816565, Spokane, USA, Nov. 12-16, 2018, 5 pages.
Qualcomm Incorporated, "NR 0MS Interruption HO," 3GPP TSG-RAN WG2 Meeting #101, R2-1803662, Athens, Greece, Feb. 26-Mar. 2, 2018, 8 pages.
Huawei, et al., "DC based NR scheme for 0ms interruption handover," 3GPP TSG-RAN WG2 #101, R2-1802473, Revision of R2-1800550, Athens, Greece, Feb. 26-Mar. 2, 2018, 7 pages.
Qualcomm Incorporated, "LTE Mobility Enhancements," 3GPP TSG-RAN WG2 Meeting #104, R2-1817813, Revision of R2-1814206, Spokane, USA, Nov. 12-16, 2018, 9 pages.
Huawei et al., "0ms mobility interruption in NR," 3GPP TSG-RAN WG2 Meeting #96, R2-168564, Reno, Nevada, Nov. 14-18, 2016, 6 pages.
CNIPA, Notification to Complete Formalities of Registration for Chinese Application No. 202110982522.6, mailed on Jan. 5, 2023, 6 pages with unofficial translation.
KIPO, Office Action for Korean Application No. 10-2021-7025694, mailed on Jan. 6, 2020, 7 pages with unofficial translation.
International Search Report and Written Opinion mailed on Oct. 28, 2019 for International Application No. PCT/CN2019/071534, filed on Jan. 14, 2019 (8 pages).

\* cited by examiner

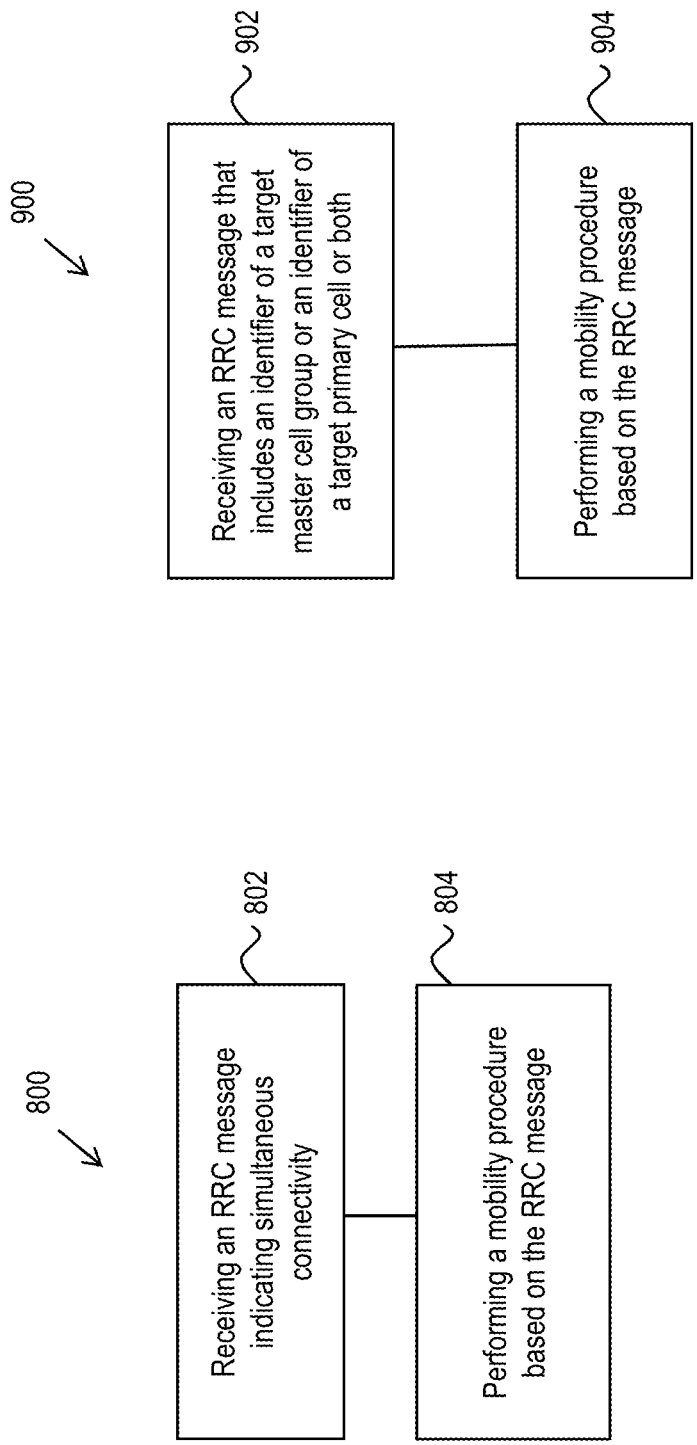

MOBILITY ENFORCEMENT IN CONNECTED WIRELESS STATE

CROSS-REFERENCE TO RELATED APPLICATIONS

This application is a continuation of International Patent Application No. PCT/CN2019/071534, filed on Jan. 14, 2019, the contents of which are incorporated herein by reference in their entirety.

TECHNICAL FIELD

The present document relates to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meet the needs of various communication scenarios. Various techniques, including new ways to provide higher quality of service, longer battery life, and improved bandwidth performance are being discussed.

SUMMARY

The present document describes techniques that can be used in various embodiments for managing mobility of wireless terminals with near zero millisecond latency.

In one example aspect, a method of wireless communication is disclosed. The method includes receiving, at a wireless terminal, from a source node, a radio resource control (RRC) message indicating use of a simultaneous connectivity mobility of the wireless terminal during a mobility procedure from the source node to a target node, and performing, by the wireless terminal, the mobility procedure based on the control message.

In another example aspect, another method of wireless communication is disclosed. The method includes receiving, at a wireless terminal, a radio resource control (RRC) message that includes an identifier of a target master cell group or an identifier of a target primary cell, or both, and performing, by the wireless terminal, a mobility procedure based on the RRC message.

In yet another example aspect, another method of wireless communication is disclosed. The method includes performing, by a wireless terminal that includes a packet data protocol convergence (PDCP) entity associated with both a source node and a target node, a security operation during a mobility procedure from the source node to the target node that includes one or more of performing a first security operation including a receive security operation or performing a second security operation including a transmitting security operation.

In yet another example aspect, another method of wireless communication is disclosed. The method includes transmitting, during handover of a wireless terminal from a source node to a target node, a message that includes: context reference information of the wireless terminal at the target node or a per radio bearer basis simultaneous connectivity mobility indicator or a context modification message that includes two sets of uplink transport layer information items per radio bearer.

In yet another aspect, one or more of the above-described methods may be implemented by a wireless communications apparatus that includes a processor.

In yet another aspect, the above-described methods may be embodied as processor-executable code and stored on a computer readable medium.

These, and other, features are described in the present document.

BRIEF DESCRIPTION OF THE DRAWINGS

FIG. 8 shows a flowchart for another example method of wireless communication.

FIG. 9 shows a flowchart for another example method of wireless communication.

DETAILED DESCRIPTION

Section headings are used in the present document only for ease of understanding and do not limit scope of the embodiments described in each section only to that section. Furthermore, while 5G terminology is used for easy understanding, the scope of the disclosed technology is not limited to 5G networks only.

1. BRIEF DISCUSSION

To improve the mobility performance, 3gpp suggests to consider some form of multiple connectivity based solutions. Generally speaking, during the state of multiple connectivity, a single radio bearer (RB) can use resources from multiple base stations or nodes (e.g. eNB, gNB, DU in case of CU-DU split etc.). In other words, the radio protocols of the single radio bearer are located in multiple network nodes. For instance, take dual connectivity as an example, the radio protocols of a single radio bearer are located in both the master node (MN) and second node (SN). The UE can make use of the resources of both MN and SN.

To make use of resources from multiple base stations, the radio protocols of a single radio bearer can be split to the multiple base stations from one of the protocol layers, e.g. RLC layer (Option1) or PDCP layer (Option2). Such an RB may be called split RB. On the contrary, the RB that can only make use of one base station can be called as a non-split RB.

Figure 1:
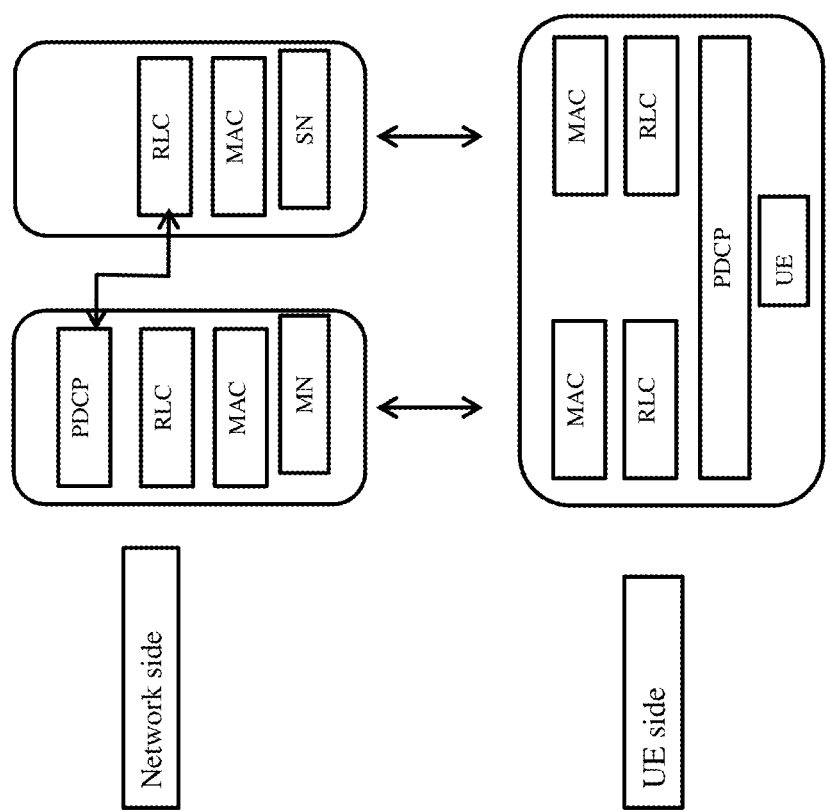
FIG. 1 shows an example of a protocol stack that is split at the radio link control (RLC) layer.

Take dual connectivity as an example, FIG. 1 illustrates Option1 that the radio protocols of a single radio bearer is split from the RLC layer. In this option, the radio bearer owns only one single PDCP entity which locates or terminates at one of the two base stations from the perspective of the network side, e.g. the MN in FIG. 1. While the radio bearer owns dual entities for all the remaining low protocol layers for MN and SN respectively, including RLC layer, MAC layer and PHY layer (the PHY layer is not depicted in FIG. 1).

Figure 2:
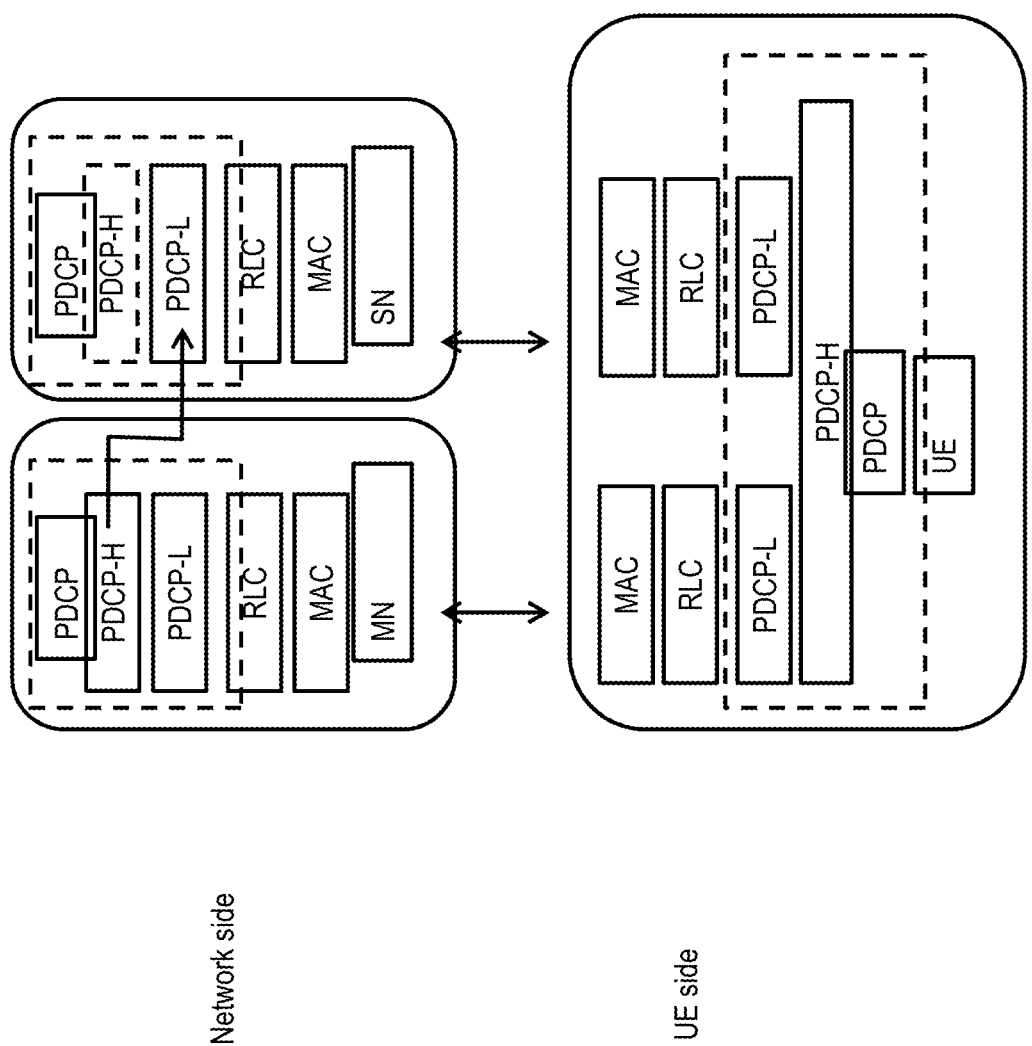
FIG. 2 shows an example of a protocol stack that is split at the packet data convergence protocol (PDCP) layer.

Also take dual connectivity as an example, FIG. 2 illustrates Option2 that the radio protocols of a single radio bearer is split from the PDCP layer. In this option, the function of the PDCP entity is split to two parts. For the transmit PDCP entity, one part (part1) includes at least the sequence numbering, header compression and the other part (part2) includes at least the integrity protection, or ciphering. Another possibility is that part1 includes only the sequence numbering and part2 includes the header compression, integrity protection and ciphering. For the receive PDCP entity, corresponding to the transmit PDCP entity, one part (part1) includes at least the reordering, header decompression and the other part (part2) includes at least the integrity verification, deciphering. Another possibility can be that part1 includes the reordering and part2 includes header decompression, integrity verification and deciphering. Among these two parts, part1 (illustrates as PDCP-H in FIG. 2) locates or terminates at one of the two base stations from the perspective of the network side, e.g. the MN in FIG. 2. While part2 (illustrates as PDCP-L in FIG. 2) locates both at MN and SN. Besides, similar as Optioin1, the radio bearer also owns dual entities for all the remaining low protocol layers for MN and SN respectively, including RLC layer, MAC layer and PHY layer.

Depending on the duration that the UE stays in the multiple connectivity states, the multiple connectivity based solutions can be generally classified into two alternatives, Non-interim based (or can also be called as DC based) or Interim based (or can also be called as eMBB based).

Take the dual connectivity as an example, as described in the following, we give the general picture of the Non-interim based solution and Interim based solution respectively.

For alternative1, the non-interim based solution, the solution generally may include the following four main stages:

Stage1 (the initial state): UE stays in the RRC CONNECTED state in the source node (S-NB).

Stage2: The target node (T-NB) is added as a second node (SN). With the addition of the SN, the UE turns into a dual connected state. The S-NB is the MN and the T-NB is the SN. Parts of or all of the setup RB(s) are turned to split RB(s). A single RB (split RB) can make use of resources both on S-NB and T-NB.

Stage3: Perform handover (HO) or role change (RC). In this stage, the role of the S-NB and the T-NB is switched, i.e., the T-NB turns to be the MN and the S-NB turns to be the SN. A single RB (split RB) can keep making use of resources both on S-NB and T-NB.

Stage4: Release of the S-NB, i.e. the SN. After the release of the S-NB, the UE connects only to the T-NB.

For alternative2, the Interim based solution, the solution generally may include the following three main stages:

Stage1: UE stays in the RRC CONNECTED state in the source node (S-NB).

Stage2: Perform HO. In this stage, the UE is handed over from the S-NB to the T-NB. However, the UE keeps connection with both the T-NB and S-NB until the S-NB is released. In this stage, a single RB can use resources both on S-NB and T-NB.

Stage3: Release of the S-NB. After the release of the S-NB, the UE connects only to the T-NB.

With the above two RB split options and the above two multiple connectivity states alternatives, there can be the following four possible multiple connectivity based mobility cases:

Case1: RLC level split Non-interim based mobility;
Case2: RLC level split Interim based mobility;
Case3: PDCP level split Non-interim based mobility;
Case4: PDCP level split Interim based mobility.

In the following, the various aspects to enforce the multiple connectivity based mobility are disclosed case by case, mainly focus on the HO or RC stage.

Mobility performance is one of the most important performance metric for Long Term Evolution (LTE) and New Radio (NR). Many services in additional to traditional voice and internet data service appear with various QoS requirements. For example, some services require ultra-reliability and low latency, including remote control, aerial, industrial automation, industrial control, or even Augmented Reality (AR) and Virtual Reality (VR). For such services, mobility performance including reliability and very low interruption time shall be guaranteed as much as possible, e.g. ~0 ms (close to 0ms) interruption time during handover are the latency target. So, mobility performance, including close to 0ms interruption and reliability, is taken as an important enhancement in 3gpp R16 schedule.

The mobility enforcement to improve the mobility performance, especially for achieving close to 0ms interruption target (e.g., less than 1 millisecond) is disclosed in this document. The disclosed techniques may be implemented in UE or network-side node embodiments, as described in the present document.

2. EXAMPLES OF EMBODIMENTS

As described in the current 3gpp documents, to achieve the multiple connectivity based mobility, there can be two alternatives, the Non-interim based solution and the Interim based solution. The Non-interim based solution generally includes four stages, among which, stage1 and stage2 can be achieved with the application of the state-of-art technologies. Similarly, the Interim based solution generally includes three stages, among which, stage1 can be achieved with the application of the state-of-art technologies.

Figure 3:
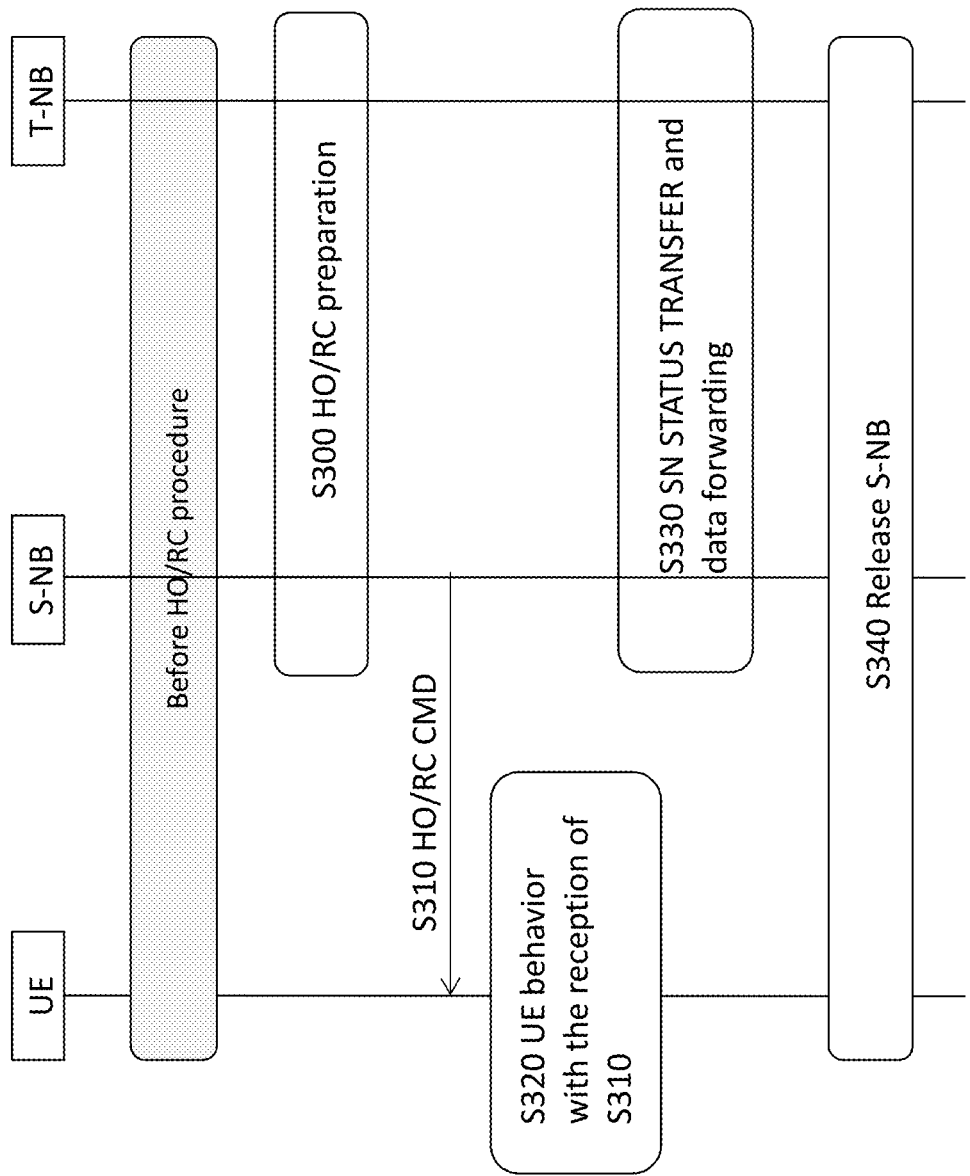
FIG. 3 shows an example of messages exchanged during a handover process.

The present document discloses the technical details of the HO or RC procedure that can provide additional operation advantages, for example, as described in the present document. FIG. 3 illustrates the basic steps of the HO or RC procedure:

S300: HO/RC preparation procedure. The procedure takes place between the S-NB and T-NB. In case of CU-DU split, the procedure also involves the necessary interactions between CU and DU.

S310: The issuing of HO/RC CMD. The S-NB issues the HO CMD or RC CMD to the UE.

S320: The UE behavior with the reception of HO/RC CMD.

Besides the HO/RC procedure, some consideration is also given for SN STATUS TRANSFER and data forwarding between S-NB and T-NB (S330) and S-NB release (S340).

Various detail aspects for the five steps in FIG. 3 are disclosed below.

2.1 for Non-Interim Based Solutions 2.1.1 Issue 1 (for S310): Issuing the Handover or Role Change Command (HO/RC CMD)

To inform the UE to perform handover or role change, i.e. to change the MN from S-NB to the T-NB and change the SN from T-NB to S-NB as well, either a new RRC message or one or a plurality of new information elements (IE) can be introduced in the existing RRC message.

2.1.1.1

Alt.1 Issuing the HO/RC CMD via a new RRC message.

The new RRC message includes at least one of the following IEs:
- An ID for the identification of this RRC procedure (RRC transaction ID);
- IE(s) for the configuration of security parameters for the T-NB. For example, the IE(s) can includes at least one (and maybe more) of the following: IE to configure AS integrity protection algorithm; IE to configure AS ciphering algorithms; a key change indicator and a next Hop Chaining Count;
- IE(s) configured per PDCP entity for the configuration of header compression parameters for the T-NB;
- IE(s) configured per RB to indicate whether to achieve interruption reduction (i.e. whether to apply handover improvement), or to indicate whether to apply Non-interim based (or DC based) mobility operation, or to indicate whether to apply a simultaneous connectivity mobility. For the purpose of easy description in the following, the IE is denoted as HandoverImprovementIndicator or DCMobilityIndicator for example.
- IE(s) for the reconfiguration or update of the existing configurations. The IE(s) can be set as an octet string which contains another RRC message, e.g. the RRCConnectionReconfiguration message in LTE or the RRCReconfiguration message in NR.

It should be noted that the "IE(s) configured per PDCP entity for the configuration of header compression parameters for the T-NB" and the HandoverImprovementIndicator IE(s) can be included in the "IE(s) for the reconfiguration or update of the existing configurations", e.g. included the existing RRC messages (the RRCConnectionReconfiguration message in LTE or the RRCReconfiguration message in NR) which would be included in the new RRC message as a container.

Figure 4:
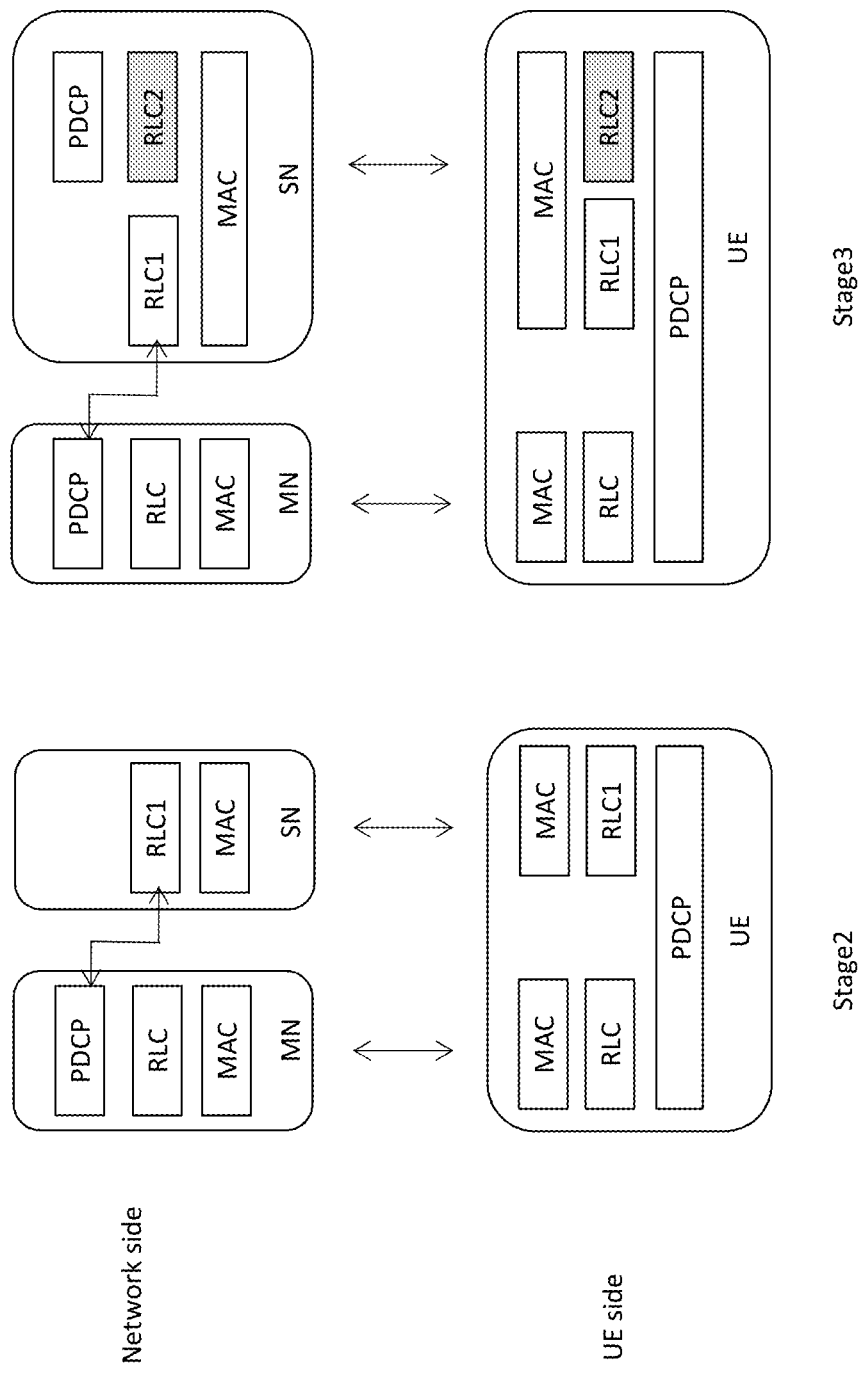
FIG. 4 shows an example of a protocol stack in which an additional RLC layer is established at a network station.

In case the Non-interim based solution is applied for the RLC level split based multiple connectivity (Case1 listed in the prior arts), besides the RLC entity which has been established on the T-NB during Stage2 (Add T-NB as a SN and change the setup RB(s) to split RB(s)), an extra RLC entity can be established on the T-NB. For example, as illustrated in FIG. 4, the extra RLC entity (RLC2) is established on the T-NB besides the RLC entity (RLC1) which was setup during Stage2.

In this case, the new RRC message can also include an extra RLC-bearer configuration per RB ("IE(s) configured per RB for the configuration of an extra RLC-bearer on the T-NB"). The extra RLC-bearer configuration includes at least one of the following IE(s): the RLC Config; the logical Channel Identity Config; the logical Channel Config. It should be noted that the extra RLC-bearer configuration can be included in the "IE(s) for the reconfiguration or update of the existing configurations", e.g. included the existing RRC messages (the RRCConnectionReconfiguration message in LTE or the RRCReconfiguration message in NR) which would be included in the new RRC message as a container.

In this particular architecture (illustrated in FIG. 4), during Stage3, among the two RLC entities on T-NB for a single RB, one RLC entity (e.g. RLC1) bears packets ciphered and integrity protected with the source key (i.e. key for the S-NB) while the other RLC entity (e.g. RLC2) bears packets ciphered and integrity protected with the target key (i.e. key for the S-NB). To inform the UE which RLC entity bears packets ciphered and integrity protected with the source key and which RLC entity bears packets ciphered and integrity protected with the target key, there can be two possible options:

2.1.1.1.1

Opt1: Add explicit indicator(s).

For example, add an explicit indicator in the RLC-bearer configuration configured for the T-NB to indicate whether the RLC bearer bears packets ciphered and integrity protected with the source key or target key. For example, if the indicator is set with value TRUE, the RLC bearer bears packets ciphered and integrity protected with the target key. Otherwise if the indicator is set with value FALSE or the indicator is absent, the RLC bearer bears packets ciphered and integrity protected with the source key.

2.1.1.1.2

Opt2: Implicit indicate via the RRC message structure itself.

For example, design the IE structures that the UE can tell which RLC bearer configuration is the extra RLC-bearer configuration. Then in this case, the RLC entity configured with the extra RLC-bearer configuration bears packets ciphered and integrity protected with the target key. Otherwise, the RLC entity bears packets ciphered and integrity protected with the source key.

2.1.1.2

Alt.2 Issuing the HO/RC CMD via one or a plurality of new IE(s) added in the existing RRC message.

The one or a plurality of new IE(s) added in the existing RRC message, e.g. the RRCConnectionReconfiguration message in LTE or the RRCReconfiguration message in NR includes at least one of the following:
- An indicator for the indication that the message is for the purpose of role change, i.e. change S-NB as the MN while change T-NB as the SN. Alternatively, the message is for the purpose of handover the UE from the S-NB to the T-NB while keep the S-NB at the same time;
- IE(s) for the configuration of security parameters for the T-NB. For example, the IE(s) can includes at least one of the following: IE to configure AS integrity protection algorithm; IE to configure AS ciphering algorithms; a key change indicator and a next Hop Chaining Count;
- IE(s) configured per PDCP entity for the configuration of header compression parameters for the T-NB;
- IE(s) configured per RB to indicate whether to achieve interruption reduction (i.e. whether to apply handover improvement), or to indicate whether to apply Non-interim based (or DC based) mobility operation, or to indicate whether to apply a simultaneous connectivity mobility. For the purpose of easy description in the following, the IE is denoted as HandoverImprovementIndicatoror DCMobilityIndicator for example.

Similarly, in case the Non-interim based solution is applied for the RLC level split based multiple connectivity, besides the above IE(s), new "IE(s) configured per RB for the configuration of an extra RLC-bearer on the T-NB" is introduced. The extra RLC-bearer configuration includes at least one of the following IE(s): the RLC Config; the logical Channel Identity Config; the logical Channel Config.

Similarly, in this particular architecture, to inform the UE which RLC entity bears packets ciphered and integrity protected with the source key and which RLC entity bears packets ciphered and integrity protected with the target key, the similar two options listed for Alt.1 can also be applied here.

2.1.2

Issue 2 (for S320): The UE Behavior with the Reception of the HO/RC CMD (in RRC Layer)

With the reception of the HO/RC CMD, the UE performs at least one of the following:

Change the MCG (Master Cell Group) to SCG (Secondary Cell Group) and SCG to MCG. Or in other words, consider the cell group configuration configured on the T-NB as the MCG and the cell group configuration configured on the S-NB as the SCG;

Generate security context associated with the T-NB according to the "IE(s) for the configuration of security parameters for the T-NB" if the IE(s) is received in the HO/RC CMD. Or keep using the security context associated with the T-NB that is already generated, e.g. the S-KNB (e.g. S-KeNB in case of LTE and S-KgNB in case of NR) and the corresponding keys generated based on the S-KNB (e.g. KRRCint, KRRCenc, KUPenc, KUPint) which are generated when the T-NB is added as a second NB. Here, the step of generating security context associated with the T-NB includes at least one of the following:

a). Derive AS keys. The AS keys includes KNB key (e.g. KeNB key in case of LTE, KgNB key in case of NR) and the keys derived based on KNB, e.g. including at least one of the following: the key for the integrity protection of RRC signalling (KRRCint), the key for the ciphering of RRC signalling (KRRCenc), the key for the ciphering of user data (KUPenc), the key for the integrity protection of user data (KUPint);
 b). Store the received next Hop Chaining Count;
 c). Store the received security algorithms, including at lease one of the following: AS integrity protection algorithm and AS ciphering algorithms;

Make the PDCP entities keep the security context associated with the S-NB. Here, the PDCP entities refers to the ones corresponding either one of the following two type of RBs:

a). All the configured S-NB terminated split RBs (for the solution that we don't introduce the HandoverImprovementIndicator IE(s) in the HO/RC CMD);
 b). The S-NB terminated split RBs that with the HandoverImprovementIndicator set as TURE (for the solution that we introduce the HandoverImprovementIndicator IE(s) in the HO/RC CMD);

For all the configured S-NB terminated RBs (includes split RB and non-split RB), configure their PDCP entities with the security context associated with the T-NB which is generated above. The security context associated with the T-NB. includes at least one of the following: configure the PDCP entities with the security algorithms associated with the T-NB, configure the PDCP entities with the AS keys associated with the T-NB;

Make the PDCP entities keep the header compression context associated with the S-NB. Here, the PDCP entities refers to the ones corresponding either one of the following two type of RBs:

a). All the configured S-NB terminated split RBs (for the solution that we don't introduce the HandoverImprovementIndicator IE(s) in the HO/RC CMD);
 b). The S-NB terminated split RBs that with the HandoverImprovementIndicator set as TURE (for the solution that we introduce the HandoverImprovementIndicator IE(s) in the HO/RC CMD);

For all the configured S-NB terminated RBs (including split RB and non-split RB), configure their PDCP entities with the header Compression context associated with the T-NB according to the "IE(s) configured per PDCP entity for the configuration of header compression parameters for the T-NB" if the IE(s) is received in the HO/RC CMD.

In addition to the above, in case "IE(s) configured per RB for the configuration of an extra RLC-bearer on the T-NB" is included in the HO/RC CMD, the UE can perform the following in addition:

Establish the extra RLC entity per RB on the T-NB according to the "IE(s) configured per RB for the configuration of an extra RLC-bearer on the T-NB";

Inform the PDCP entity which RLC entity bears packets ciphered and integrity protected with the target key.

Here, with the reception of RC/HO CMD, the UE need not to perform random access on the T-NB, needs not to reset S-NB MAC and T-NB MAC, and need not to reset the S-NB RLC entity and T-NB RLC entity at least for either one of the following two types of RBs:

All the configured S-NB terminated split RBs (for the solution that we don't introduce the HandoverImprovementIndicator IE(s) in the HO/RC CMD);

The S-NB terminated split RBs that with the HandoverImprovementIndicator set as TURE (for the solution that we introduce the HandoverImprovementIndicator IE(s) in the HO/RC CMD);

Here, configured S-NB terminated RB refers to the S-NB terminated RB that has been configured before the reception of HO/RC CMD, i.e. the S-NB terminated RB that has been configured during Stage2.

Here, for RLC level split RB (Option1, FIG. 1), S-NB terminated split RB refers to the split RB whose PDCP entity locates or terminates on the S-NB. For PDCP level split RB (Option2, FIG. 2), S-NB terminated split RB refers to the split RB whose PDCP-H locates or terminates on the S-NB.

Here, the security context associated with the T-NB is generated during either one of the following times:

T1: generated with the reception of HO/RC CMD if IE(s) for the configuration of security parameters for the T-NB is received in the HO/RC CMD;

T2: generated before the reception of HO/RC CMD, i.e. generated during Stage2 if IE(s) for the configuration of security parameters for the T-NB is received during Stage2. In this case, the generation of the security context associated with the T-NB is performed with the prior art.

Typically, the UE performs the above behaviors in the RRC layer.

In the following, examples are given to illustrate the UE behavior in RRC layer with the reception of the HO/RC CMD for Case1 (RLC level split Non-interim based mobility) and Case3 (PDCP level split Non-interim based mobility) respectively.

Example 1 for Case1 (RLC Level Split Non-Interim Based Mobility)

In example 1, HandoverImprovementIndicator is not supported to be introduced in the HO/RC CMD.

Initially, UE is currently operating with dual connectivity. S-NB is the MN and T-NB is the SN. The UE is configured with one MN(S-NB) terminated split signalling radio bearer (SRB1) and two MN(S-NB) terminated split data radio bearer, DRB1 and DRB2. For all the configured RBs (SRB1, DRB1 and DRB2), their PDCP entities are configured with the security context and header compression context associated with the S-NB.

The UE receives a HO/RC CMD from the S-NB. "IE(s) for the configuration of security parameters for the T-NB" and "IE(s) configured per PDCP entity for the configuration of header compression parameters for the T-NB" separately for SRB1, DRB1 and DRB2" are included in the received HO/RC CMD.

With the reception of HO/RC CMD, the UE conducts one or more of the following actions:

Change the MCG to SCG and SCG to MCG, i.e. change the T-NB as the MCG and the S-NB as the SCG;

Generate security context associated with the T-NB according to the "IE(s) for the configuration of security parameters for the T-NB".

For each of the configured RBs (SRB1, DRB1 and DRB2), the UE keeps the PDCP entity associated with the security context associated with the S-NB. And meanwhile, the UE configures the PDCP entity with the security context associated with the T-NB which is generated above.

For each of the configured RBs (SRB1, DRB1 and DRB2), the UE keeps the PDCP entity associated with the header compression context associated with the S-NB. Meanwhile, the UE configures the PDCP entity with the header compression context associated with the T-NB according to the IE(s) received in the HO/RC CMD for the configuration of header compression parameters corresponding to this RB.

Example 2 for Case1 (RLC Level Split Non-Interim Based Mobility)

In example 2, HandoverImprovementIndicator is introduced in the HO/RC CMD.

Same as in example 1, the UE is currently operating with dual connectivity. S-NB is the MN and T-NB is the SN. The UE is configured with one MN(S-NB) terminated split signalling radio bearer (SRB1) and two MN(S-NB) terminated split data radio bearer, DRB1 and DRB2. For all the configured RBs (SRB1, DRB1 and DRB2), their PDCP entities are configured with the security context and header compression context associated with the S-NB. In example1, DRB1 bearers service packets that latency sensitive.

The UE receives a HO/RC CMD from the S-NB. "IE(s) for the configuration of security parameters for the T-NB" and "IE(s) configured per PDCP entity for the configuration of header compression parameters for the T-NB" separately for SRB1, DRB1 and DRB2" are included in the received HO/RC CMD. In addition, HandoverImprovementIndicator is set to TRUE only for DRB1.

With the reception of HO/RC CMD, the UE conducts one or more of the following actions:

Change the MCG to SCG and SCG to MCG;

Generate security context associated with the T-NB according to the "IE(s) for the configuration of security parameters for the T-NB".

For DRB1, the UE keeps the PDCP entity associated with the security context associated with the S-NB. And meanwhile, the UE configures the PDCP entity with the security context associated with the T-NB which is generated above. While for SRB1 and DRB2, the UE configure the corresponding PDCP entity with the security context associated with the T-NB which is generated above.

Note: in this example, the UE may not perform the action to keep the PDCP entity of SRB1 and DRB2 associated with the security context associated with the S-NB. It implicitly means that the header compression context associated with the S-NB is released.

Similarly for DRB1, the UE keeps the PDCP entity associated with the header compression context associated with the S-NB. And meanwhile, the UE configures the PDCP entity with the header compression context associated with the T-NB according to the IE(s) received in the HO/RC CMD for the configuration of header compression parameters corresponding to this RB. While for SRB1 and DRB2, the UE configures the corresponding PDCP entity with the header compression context associated with the T-NB according to the IE(s) received in the HO/RC CMD for the configuration of header compression parameters corresponding to this RB.

In this example, the UE need not perform the action to keep the PDCP entity of SRB1 and DRB2 associated with the header compression context associated with the S-NB. It implicitly means that the header compression context associated with the S-NB is released.

Example 3 for Case3 (PDCP Level Split Non-Interim Based Mobility)

Initially, UE is currently operating with dual connectivity. S-NB is the MN and T-NB is the SN. The UE is configured with one MN(S-NB) terminated split SRB1, two MN(S-NB) terminated split DRBs (DRB1, DRB2) and one SN(T-NB) terminated split DRB3. For all the configured RBs, their PDCP entities are configured with both the security context associated with the S-NB and the security context associated with the T-NB. While regarding the header compression context, the PDCP entities for SRB1, DRB1 and DRB2 are configured with header compression context associated with the S-NB. While the PDCP entity for DRB3 is configured with header compression context associated with the T-NB.

The UE receives a HO/RC CMD from the S-NB. "IE(s) configured per PDCP entity for the configuration of header compression parameters for the T-NB" separately for SRB1, DRB1 and DRB2" are included in the received HO/RC CMD.

With the reception of HO/RC CMD, the UE conducts one or more of the following actions:

Change the MCG to SCG and SCG to MCG;

For all the configured RBs (SRB1, DRB1, DRB2, DRB3), the UE keeps the PDCP entity associated with both the security context associated with the S-NB and the security context associated with the T-NB;

For all the configured S-NB terminated DRBs (DRB1, DRB2), the UE keeps the PDCP entity associated with the header compression context associated with the S-NB. And meanwhile, the UE configures the PDCP entity with the header compression context associated with the T-NB according to the IE(s) received in the HO/RC CMD for the configuration of header compression parameters corresponding to this RB.

For SRB1, the UE configure its PDCP entity with the header compression context associated with the T-NB according to the IE(s) received in the HO/RC CMD for the configuration of header compression parameters corresponding to SRB1.

Note: in this example, the UE doesn't perform the action to keep the PDCP entity of SRB1 associated with the header compression context associated with the S-NB. It implicitly means that the header compression context associated with the S-NB is released.

Issue 3 (for S320): The UE Behavior with the Reception of the HO/RC CMD (in PDCP Layer)

With the reception of the HO/RC CMD, the UE performs PDCP configuration according to the HO/RC CMD per discussed in Issue2. The PDCP entity performs receive operation and transmit operation according to the RRC configuration.

For the PDCP entity which is configured both with the security context associated with the S-NB and the security context associated with the T-NB, the PDCP entity performs either one of the following security operation for the receive operation:

Receive security operation1: Perform deciphering and integrity verification, using the source key (key associated with the S-NB, i.e. the SN in stage3), for the PDCP PDU which is integrity protected and ciphered with the source key and perform deciphering and integrity verification, using the target key (key associated with the T-NB, e.g., the MN in stage3) for the PDCP PDU which is integrity protected and ciphered with the target key in parallel.

Receive security operation2: Perform deciphering and integrity verification, using the target key, for the PDCP PDU which is integrity protected and ciphered with the target key only after all the PDCP PDUs which are integrity protected and ciphered with the source key have finished their deciphering and integrity verification using the source key.

For the PDCP entity which is configured both with the security context associated with the S-NB and the security context associated with the T-NB, the PDCP entity performs either one of the following security operation for the transmit operation:

Transmit security operation1: Keep performing integrity protection, and ciphering for PDCP SDUs with the source key until receiving the indication from the network which indicates to use the target key or until the releasing of the S-NB.

Transmit security operation2: Perform integrity protection, and ciphering for PDCP SDUs with the target key and submit the resulting PDCP PDU to the RLC entity which is established on the T-NB.

Transmit security operation3: Perform integrity protection, and ciphering for PDCP SDUs with the target key and submit the resulting PDCP PDU to at least one of the lower layers:
 The RLC entity which is established on the T-NB;
 The RLC entity which is established on the S-NB;

It should be noted that if the solution is applied for the case of RLC level split based multiple connectivity (Case1 listed in the prior arts) and two RLC entities are established on T-NB associated with the single PDCP entity, in case of Transmit security operation2 and Transmit security operation3, the PDCP entity submit the resulting PDCP PDU to the RLC entity that is configured to bear packets ciphered and integrity protected with the target key.

It should be noted that if the solution is applied for the case of PDCP level split Non-interim based mobility (Case3 listed in the prior art), the PDCP entity may be split into PDCP-H sublayer and PDCP-L sublayer. In this case, for the PDCP entity which is configured both with the security context associated with the S-NB and the security context associated with the T-NB, there can be two PDCP-L sublayers. One PDCP-L performs security operation using the source key and the other PDCP-L performs security operation using the target key.

For the PDCP entity which is configured both with the header compression context associated with the S-NB and the header compression context associated with the T-NB, the PDCP entity performs either one of the following header compression operation for the transmit operation:

Header compression operation1: Keep performing header compression for PDCP SDUs with the source header compression context until receiving the indication from the network which indicates to use the target header compression context or until the releasing of the S-NB.

Header compression operation2: Perform header compression for PDCP SDUs with the target header compression context and submit the resulting PDCP PDU to the RLC entity which is established on the T-NB.

Header compression operation3: Perform header compression for PDCP SDUs with the target header compression context and submit the resulting PDCP PDU to at least one of the lower layers:
 The RLC entity which is established on the T-NB;
 The RLC entity which is established on the S-NB.

It should be noted that header decompression is performed after reordering. So for the PDCP entity which is configured both with the header compression context associated with the S-NB and the header compression context associated with the T-NB, the mechanism itself can ensure that the PDCP SDU compressed with the target header compression context would be decompressed after all the PDCU SDUs compressed with the source header compression context finish decompression.

To facilitate the receiver to differentiate at least one of the following:
 Which packet is integrity protected and ciphered with the source key and which packet is integrity protected and ciphered with the target key;
 Which packet is header compressed with the source header compression context and which packet is header compressed with the target header compression context;
 An Indicator can be added in the PDCP PDU. For example, when the Indicator is set to "1", the packet is integrity protected and ciphered with the source key and/or header compressed with the source header compression context. Otherwise, the packet is integrity protected and ciphered with the target key and/or header compressed with the target header compression context.

Figure 5:
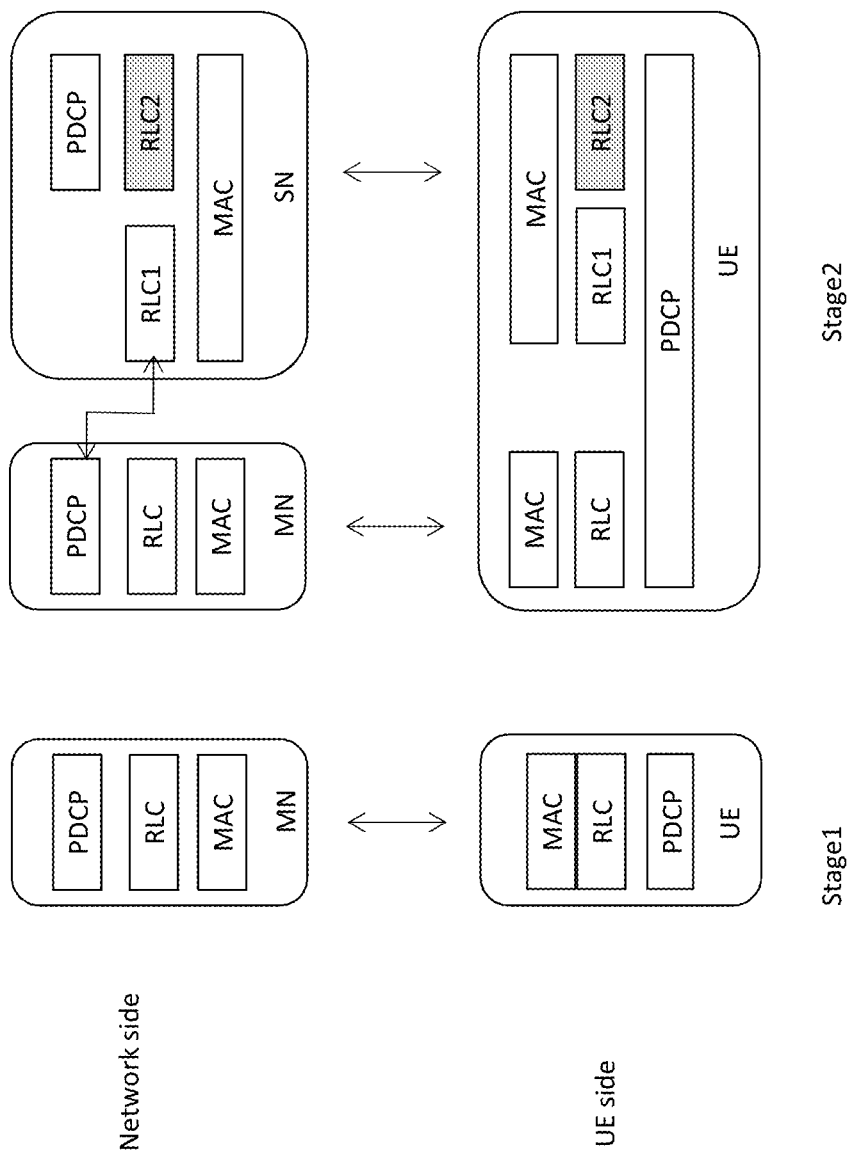
FIG. 5 shows an example of a protocol stack for handling an added indicator in a PDCP protocol data unit.

Take the PDCP level spit solutions for example, FIG. 5 illustrates an example for the handling added "Indicator" in the PDCP PDU.

In FIG. 5, after with the reception of HO/RC CMD and before the release of the S-NB, PDCP PDUs with SN 1-3 are distributed from the PDCP-H in the S-NB to the PDCP-L in the T-NB. PDCP PDUs with SN 4-5 are submitted from PDCP-H to the PDCP-L in the T-NB. So in this case, PDCP PDU with SN 1-3 have the "Indicator" set as 0 while PDCP PDU with SN 4-5 have the "Indicator" set as 1.

Due to the transmission delay over the radio, the 5 PDUs are received at the RLC entity of the T-NB on UE with the SN order as 1,2,4,3,5. However, with reordering process either at the RLC entity or PDCP-H entity in the UE, when performing header decompression, the packets are reordered in sequence as illustrated in FIG. 5. The PDCP-H can differentiate from the "Indicator" whether to perform header decompression with the source header compression context or target header compression context.

It should be noted that if the solution is applied for the case of PDCP level split based multiple connectivity (Case3 listed in the current standard), the UE can differentiate which packet is integrity protected and ciphered with the source key and which packet is integrity protected and ciphered with the target key from the RLC entity where the packet is received. For example, if the packet is received from the RLC entity that is established for the T-NB, then the packet is integrity protected and ciphered with the target key, otherwise the packet is integrity protected and ciphered with the source key.

Issue 4 (For S340): Release S-NB

The T-NB can inform the UE to release the S-NB with the reception of one or more END MARKER(s) from the S-NB.

For example, the S-NB can send an END MARKER to the T-NB when all the data buffered in the S-NB have finished transmission. In this case, the T-NB can inform the UE to release the S-NB with the reception of the END MARKER. Or the S-NB can send an END MARKER per RB to the T-NB when all the data buffered for the corresponding RB have finished transmission. In this case, the T-NB can inform the UE to release the S-NB with the reception of all the END MARKERs for each RB.

Issue 5 (For S300): HO/RC Preparation

To perform handover or role change preparation, the S-NB sends a message to the T-NB.

The UE Context Reference information at the T-NB can be included in this message.

The UE Context Reference information at the T-NB includes the T-NB UE X2AP ID.

The UE Context Reference information at the T-NB is served at least one of the following purposes:

a) Uniquely identify the UE over the X2 (or Xn) interface (e.g., interface between S-NB and T-NB) within the T-NB. In case the T-NB is a LTE nodeB, an extension T-NB UE X2AP ID can also be included. The UE context can be uniquely identified with the combined of the T-NB UE X2AP ID and extension T-NB UE X2AP ID in LTE.

b) Indicate the purpose to achieve interruption reduction, i.e. to apply handover improvement, or to indicate whether to apply Non-interim based (or DC based) mobility operation, or to indicate whether to apply a simultaneous connectivity mobility.

Per RB information to indicate whether to achieve interruption reduction (i.e. whether to apply handover improvement), e.g., HandoverImprovementIndicator can be included in this message. Otherwise, the purpose may be to indicate whether to apply Non-interim based (or DC based) mobility operation, e.g. DCMobilityIndicator. Or to indicate whether to apply a simultaneous connectivity mobility;

It should be noted that in LTE, one RB over the air (i.e. between UE and the eNB) corresponds to one E-RAB (E-UTRAN Radio Access Bearer) between UE and the S-GW (serving gateway), so in LTE, the "Per RB information to indicate whether to achieve interruption reduction (i.e. whether to apply handover improvement)" equals to "Per E-RAB information to indicate whether to achieve interruption reduction (i.e. whether to apply handover improvement).

In case of CU-DU split, in the network side, the PDCP entity is located in the CU while the entities below PDCP, e.g. RLC, MAC, PHY are located in the DU. Meanwhile in case the Non-interim based solution is applied for the RLC level split based multiple connectivity (Case1 listed in the prior arts), besides the RLC entity which has been established on the T-NB during Stage2, an extra RLC entity can be established on the T-NB (as illustrated in FIG. 4). To make the solution work, with the reception of HO/RC CMD, the CU sends a message1 (e.g. UE CONTEXT MODIFICATION REQUEST) to DU and DU responds with a message (e.g. UE CONTEXT MODIFICATION RESPONSE) to CU.

In message1, two sets of uplink transport layer information items (UL UP TNL Information item) are included per RB. The UL UP TNL Information item includes the UL UP TNL Information. The UL UP TNL Information can include at least one of the following: Transport Layer Address, GTP Tunnel Endpoint Identifier. Each of the UL UP TNL Information item corresponds to one RLC entity setup in the DU respectively.

In message2, two sets of downlink transport layer information items (DL UP TNL Information item) are included per RB. The DL UP TNL Information item includes at least one of the following:

DL UP TNL Information: includes at least one of the following: Transport Layer Address, GTP Tunnel Endpoint Identifier;

Indication whether the transport layer is used for bearing packets ciphered and integrity protected with the source key or target key. For example, if the indication is set to "1", it means the transport layer is used for bearing packets ciphered and integrity protected with the target key. While if it is set to "0", it means the transport layer is used for bearing packets ciphered and integrity protected with the source key.

Issue 6 (for S340): SN STATUS TRANSFER and Data Forwarding

The purpose of the SN Status Transfer procedure is to transfer the uplink PDCP SN and HFN receiver status and the downlink PDCP SN and HFN transmitter status either, from the S-NB to the T-NB for each respective DRB of the source DRB configuration for which PDCP SN and HFN status preservation applies.

In this disclosure, with the reception of one or more END MARKER(s) from the core network, the S-NB sends SN STATUS TRANSFER to the T-NB.

For example, if operating in LTE, when the S-NB receives an END MARKER from the core network for a DRB, the S-NB sends SN STATUS TRANSFER to the T-NB which includes the SN status for this specific DRB. Or for example, if operating in NR, when the S-NB receives the END MARKER(s) from the core network for all the PDU session(s) that mapped on a DRB, the S-NB sends SN STATUS TRANSFER to the T-NB which includes the SN status for this specific DRB.

In this disclosure, with the reception of a packet ciphered and integrity protected with the target key (i.e. key associated with the T-NB) and/or a packet header compressed with the target header compression context, the S-NB forwards the packet to the T-NB.

2.2 for Interim Based Solutions

Issue 1 (for S310): Issuing the Handover Command (HO CMD)

To inform the UE to perform a handover for which the UE keeps connection with both the T-NB and S-NB until the S-NB is released, the existing RRC message (e.g. the RRCConnectionReconfiguration message in LTE or the RRCReconfiguration message in NR) can be reused with the addition of at least one (or more) of the following IEs:

An indicator to indicate that the UE should keep connection with both the T-NB and S-NB until the S-NB is released, or in other words, to indicate that it is an eMBB based handover);

IE(s) for the configuration of security parameters for the T-NB. For example, the IE(s) can includes at least one of the following: IE to configure AS integrity protection algorithm; IE to configure AS ciphering algorithms; a key change indicator and a next Hop Chaining Count;

IE(s) configured per PDCP entity for the configuration of header compression parameters for the T-NB;

IE(s) configured per RB for the configuration of the RLC-bearer on the T-NB;

IE(s) configured per RB to indicate whether to achieve interruption reduction (i.e. whether to apply handover improvement), e.g. HandoverImprovementIndicator. Another use may be to indicate whether to apply Interim based (or eMBB based) mobility operation, e.g. eMBBIndicator. Another use may be to indicate whether to apply a simultaneous connectivity mobility.

Figure 6:
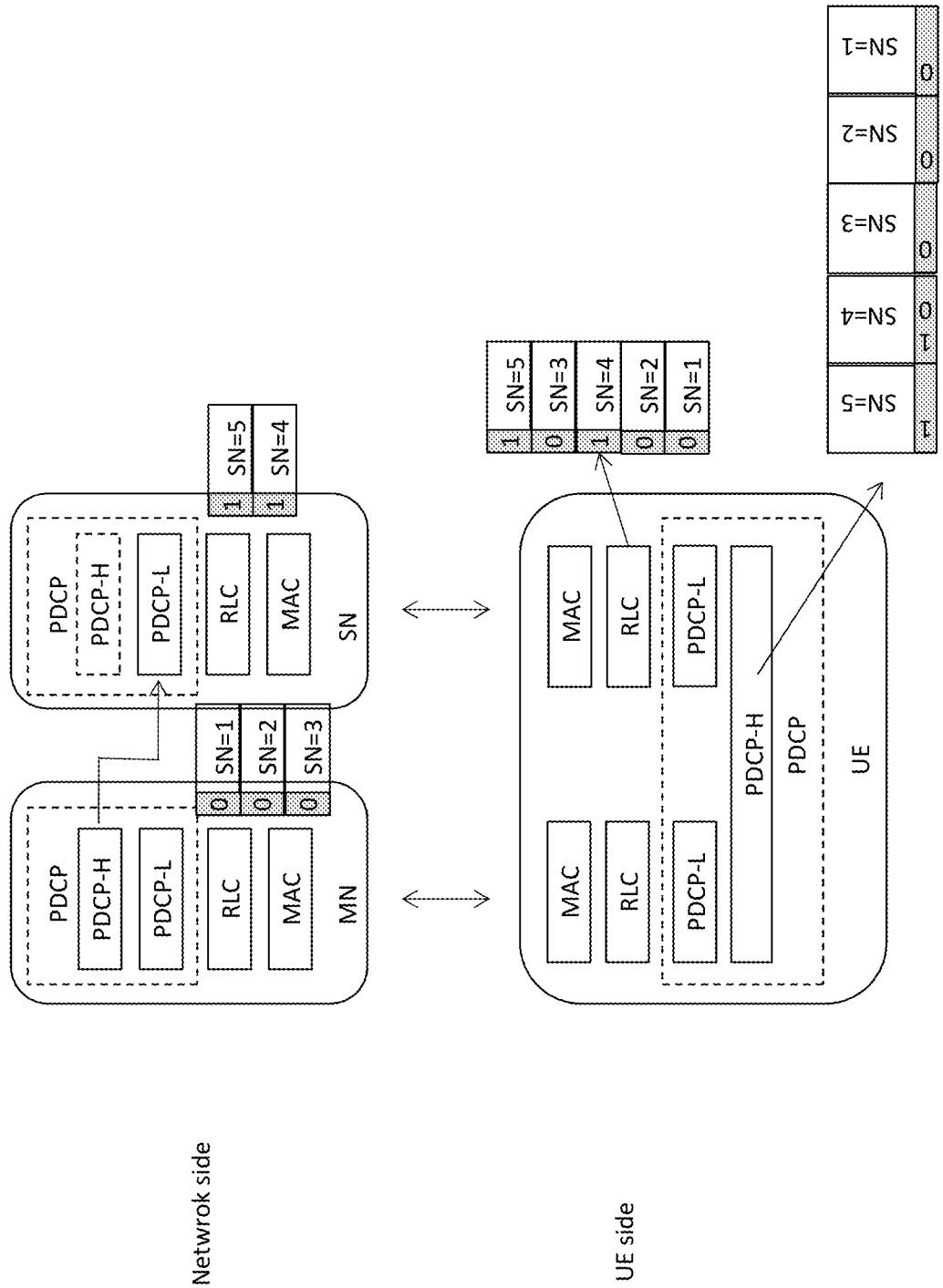
FIG. 6 shows an example of a protocol stack with two RLC layers for managing a handover process.

Similarly as for the Non-Interim based solution, here, in case the Interim based solution is applied for the RLC level split based multiple connectivity (Case2 listed in the prior arts), two RLC entities can be established on the T-NB during the handover procedure. For example as illustrated in FIG. 6, two RLC entities (RLC1 and RLC2) are established on the T-NB during Stage2.

Given that, besides the above "IE(s) configured per RB for the configuration of the RLC entity on the T-NB", one more configuration for an extra RLC entity, i.e. "IE(s) configured per RB for the configuration of an extra RLC-bearer on the T-NB" can also be included additionally in the existing RRC message.

Also, similar as for the Non-Interim based solution, with the configuration of two RLC entities, to inform the UE which RLC entity bears packets ciphered and integrity protected with the source key and which RLC entity bears packets ciphered and integrity protected with the target key, the similar two options can also be applied here:
Opt1: Add explicit indicator(s).
Opt2: Implicit indicate via the RRC message structure itself.

Issue 2 (for S320): The UE Behavior with the Reception of the HO CMD (in RRC Layer)

With the reception of the HO CMD, the UE performs at least one of the following:
Create an T-NB MAC entity;
Establish the RLC entity per RB according to the received "IE(s) configured per RB for the configuration of the RLC entity on the T-NB";
Generate security context associated with the T-NB according to the "IE(s) for the configuration of security parameters for the T-NB" if the IE(s) is received in the HO CMD;
Make the PDCP entities keep the security context associated with the S-NB. Here, the PDCP entities refers to the ones corresponding either one of the following two type of RBs:
a) All the configured RBs (for the solution that we don't introduce the HandoverImprovementIndicator IE(s) in the HO CMD);
b) The RBs that with the HandoverImprovementIndicator set as TURE (for the solution that we introduce the HandoverImprovementIndicator IE(s) in the HO CMD);
For all the configured RBs, configure their PDCP entities with the security context associated with the T-NB which is generated above. The security context associated with the T-NB. includes at least one of the following: configure the PDCP entities with the security algorithms associated with the T-NB, configure the PDCP entities with the AS keys associated with the T-NB;
Make the PDCP entities keep the header compression context associated with the S-NB. Here, the PDCP entities refers to the ones corresponding either one of the following two type of RBs:
a) All the configured RBs (for the solution that we don't introduce the HandoverImprovementIndicator IE(s) in the HO CMD);
b) The RBs that with the HandoverImprovementIndicator set as TURE (for the solution that we introduce the HandoverImprovementIndicator IE(s) in the HO CMD);
For all the configured RBs, configure their PDCP entities with the header Compression context associated with the T-NB according to the "IE(s) configured per PDCP entity for the configuration of header compression parameters for the T-NB" if the IE(s) is received in the HO CMD;
Similar as for the Non-interim based solutions, in addition to the above, in case "IE(s) configured per RB for the configuration of an extra RLC-bearer on the T-NB" is included in the HO CMD, the UE can perform the following in addition:
Establish the extra RLC entity per RB on the T-NB according to the "IE(s) configured per RB for the configuration of an extra RLC-bearer on the T-NB";
Inform the PDCP entity which RLC entity bears packets ciphered and integrity protected with the target key.

Here, with the reception of HO CMD, the UE needs not to reset S-NB MAC and needs not to reset the S-NB RLC entity at least for either one of the following two types of RBs.

All the configured RBs (for the solution that we don't introduce the HandoverImprovementIndicator IE(s) in the HO CMD).

The S-NB RBs that with the HandoverImprovementIndicator set as TURE (for the solution that we introduce the HandoverImprovementIndicator IE(s) in the HO CMD).

Typically, the UE performs the above behaviors in the RRC layer.

Issue 3 (for S320): The UE Behavior with the Reception of the HO CMD (in PDCP Layer)

With the reception of the HO CMD, the UE performs PDCP configuration according to the HO CMD per discussed in Issue2. The PDCP entity performs receive operation and transmit operation according to the RRC configuration. The security operation and header compression operation discussed in Issue 3 for the Non-interim based solutions are also applied here.

Issue 4 (For S340): Release S-NB

The same approach discussed in Issue 4 for Non-interim based solutions can also applied here.

Issue 5 (for S300): HO Preparation

To perform handover preparation, the S-NB sends a message (e.g. HANDOVER REQUEST) to the T-NB. Same as for Non-interim based solutions, at least one of the following information can be included in this message:
UE Context Reference information at the T-NB;
Per RB information to indicate whether to achieve interruption reduction (i.e. whether to apply handover improvement), e.g., HandoverImprovementIndicator. Another use may be to indicate whether to apply Interim based (or eMBB based) mobility operation, e.g. eMBBIndicator. Or to indicate whether to apply a simultaneous connectivity mobility;

And similarly, in case of CU-DU split and the Non-interim based solution is applied for the RLC level split based multiple connectivity (Case1 listed in the prior arts), To make the solution work, with the reception of HO/RC CMD, the CU sends a message1 (e.g. UE CONTEXT SETUP REQUEST) to DU and DU responds with a message (e.g. UE CONTEXT SETUP RESPONSE) to CU. Then same as for the Non-interim based solutions, in message1, two sets of uplink transport layer information items (UL UP TNL Information item) are included per RB. And in message2, two sets of downlink transport layer information items (DL UP TNL Information item) are included per RB.
Issue 6 (for S340): SN STATUS TRANSFER and Data Forwarding The same approach for the Non-interim based solutions can also applied here, including:

With the reception of one or more END MARKER(s) from the core network, the S-NB sends SN STATUS TRANSFER to the T-NB.

With the reception of a packet ciphered and integrity protected with the target key (i.e. key associated with the T-NB) and/or a packet header compressed with the target header compression context, the S-NB forwards the packet to the T-NB.

Besides the multiple connectivity based solutions disclosed in 2.1 and 2.2. In the following, another kind of mobility enforcement in connected wireless state is disclosed which can also reduce the mobility interruption.

2.3 Mobility enforcement for UE configured with carrier aggregation.

The UE is configured more than one serving cells and operating in carrier aggregation. Each serving cell is configured with a Serving Cell Index (ServCellIndex). For example, the primary cell (PCell) is configured with ServCellIndex=0, the second cells (SCell) are configured with ServCellIndex1,2,3 . . . respectively. Then the network decides to hand over the UE from the PCell to one of the SCell, e.g. SCell with ServCellIndex=2. The network sends a RRC message (e.g. RRCConnectionReconfiguration message in LTE or RRCReconfiguration message in NR) to the UE. The RRC message indicates the target PCell index, e.g. PCell index=2. With the reception of the RRC message, the UE considers the serving cell with ServCellIndex=2 as the PCell. And the UE considers the source PCell as a serving cell. In this case, the UE needs not to perform random access on the target PCell (i.e. the original SCell with ServCellIndex=2), needs not to reset MAC entity, needs not to re-establish RLC entity(ies). So the handover interruption can be reduced, e.g. to 0ms.

2.4 Mobility enforcement for UE configured with dual connectivity.

The UE is operating with DC, i.e. configured with a MCG and a SCG. Each cell group is configured with a Cell Group ID (CellGroupId). For example, the MCG is configured with CellGroupId=0 and the SCG is configured with CellGroupId=1. Multiple serving cells can be configured for each cell group. For example, MCG is configured with a PCell with ServCellIndex=0, a SCell with ServCellIndex=1. SCG is configured with a PSCell (Primary SCG Cell) with ServCellIndex=1, a SCell with ServCellIndex=2.

In the first example, the network decides to hand over the UE from the PCell to PSCell. The network sends a RRC message (e.g. RRCReconfiguration) to the UE. The RRC message indicates the target MCG ID=1. With the reception of the RRC message, the UE considers the cell group with CellGroupId=1 (i.e. the source SCG in this example) as the MCG. And the UE considers the source MCG as the SCG. And, the UE considers the source PSCell as the PCell and the considers the source PCell as the PSCell vice versa.

In the second example, the network decides to hand over the UE from the PCell to the SCell with ServCellIndex=2 on the SCG. The network sends a RRC message (e.g. RRCReconfiguration) to the UE. The RRC message indicates the target MCG ID=1, target PCell index=2. With the reception of RRC message, the UE considers the cell group with CellGroupId=1 (i.e. the source SCG in this example) as the MCG. And the UE considers the source MCG as the SCG. And, the UE considers the SCell with ServCellIndex=2 on the source SCG as the PCell. Considers the source PCell as a SCell.

In this case, the UE needs not to perform random access on the target PCell, so the the handover interruption can be reduced.

Figure 7:
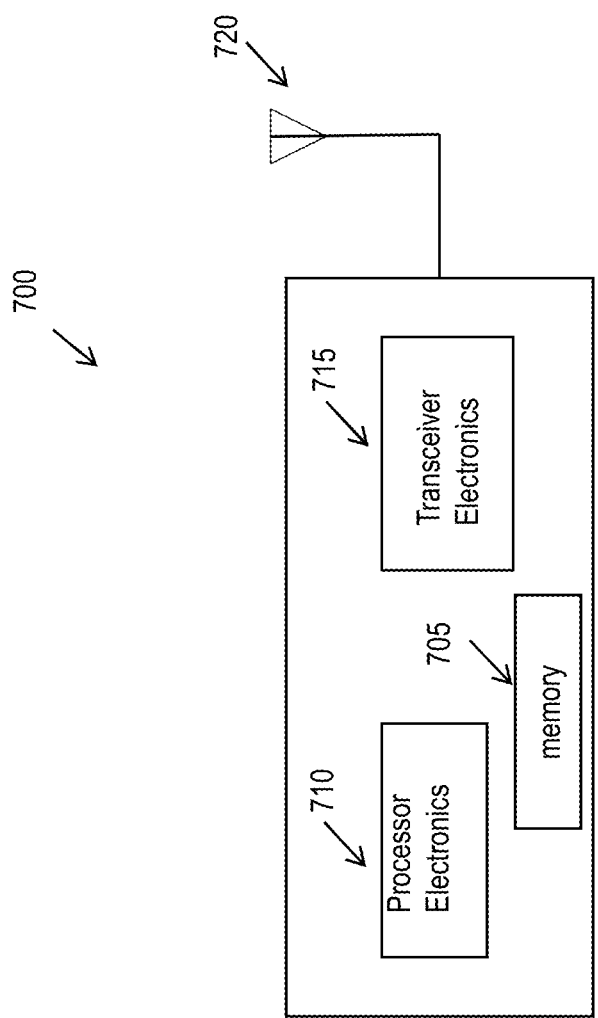
FIG. 7 is a block diagram showing an example embodiment of a communication apparatus.

FIG. 7 shows an example hardware platform 700 that may be used to implement a wireless terminal or a source node or a target node described in the present document. The wireless terminal may be, for example, a user equipment (UE) such as a smartphone, a tablet, an Internet of Things (IoT) device, an autonomous vehicle, a smartwatch or another device capable of wireless transmission/reception.

The hardware platform 700 includes processor electronics 710 and transceiver electronics 715. The hardware platform 700 may include memory 705 and antenna 720. The memory 705 and antenna 720, however, may not be discretely identifiable in some implementations. The processor electronics 710 may be programmable to implement one of the methods described in the present document. The transmission and reception of signals during the implementation of the methods may be achieved using transceiver electronics 715, which may be controlled by the processor electronics 710. The antenna 720 may include same or different transmit and receive antennas for transmitting and receiving wireless signal transmissions. The memory 705 may be used to store code executed by the processor electronics 710 and/or additional data and configuration information.

FIG. 8 is a flowchart representation of an example method 800 of wireless communication. The method 800 includes receiving (802), at a wireless terminal, from a source node, a radio resource control (RRC) message indicating use of a simultaneous connectivity mobility of the wireless terminal during a mobility procedure from the source node to a target node, and performing (804), by the wireless terminal, the mobility procedure based on the control message.

FIG. 9 is a flowchart representation of an example method 900 of wireless communication. The method 900 includes receiving (902), at a wireless terminal, a radio resource control (RRC) message that includes an identifier of a target master cell group or an identifier of a target primary cell, or both, and performing (904), by the wireless terminal, a mobility procedure based on the RRC message.

These methods may include the following additional features. Section 2 includes further example embodiments.

In some embodiments, the indicating use of the simultaneous connectivity mobility of the wireless terminal includes: indicating that roles of the source node and the target node are being changed between master and secondary roles.

In some embodiments, the indicating use of the simultaneous connectivity mobility of the wireless terminal includes: indicating keeping connections with both the source node and the target node until the source node is released.

In some embodiments, the indicating use of the simultaneous connectivity mobility of the wireless terminal includes: indicating a per radio bearer basis simultaneous connectivity mobility indicator.

In some embodiments, the performing the mobility procedure includes: changing a current master cell group to a next secondary cell group and changing a current secondary cell group to a next master cell group.

In some embodiments, the performing the mobility procedure includes: generating a security context associated with the target node according to the security parameters received in the RRC message.

In some embodiments, the performing the mobility procedure includes: keeping the security context of a packet data convergence protocol (PDCP) entity associated with the source node unchanged.

In some embodiments, the performing the mobility procedure includes: keeping the header compression context of a PDCP entity associated with the source node unchanged.

In some embodiments, the performing the mobility procedure includes: configuring a security context of a PDCP entity with a security context associated with the target node which is generated according to security parameters received in the RRC message.

In some embodiments, the performing the mobility procedure includes: configuring a header compression context of a PDCP entity associated with the target node according to header compression parameters configured for the PDCP entity, which are received in the RRC message.

In some embodiments, the keeping the security context includes: keeping the security context of the PDCP entity associated with the source node that is associated with either a configured source node terminated split radio bearer.

In some embodiments, the keeping the security context includes: keeping the security context of the PDCP entity associated with the source node that is associated with either a configured source node terminated split radio bearer which is configured with a simultaneous connectivity mobility indicator.

In some embodiments, the keeping the header compression context includes: keeping the header compression context of the PDCP entity associated with the source node that is associated with a configured source node terminated split radio bearer.

In some embodiments, the keeping the header compression context includes: keeping the header compression context of the PDCP entity associated with the source node that is associated with a configured source terminated split radio bearer which is configured with a simultaneous connectivity mobility indicator.

In some embodiments, the method further includes: establishing an extra radio link control (RLC) entity for a radio bearer on the target node according to an extra RLC configuration included in the RRC message; and informing a PDCP entity of an RLC entity that bears packets ciphered and integrity protected with a key associated with the target node.

In some embodiments, the performing the mobility procedure includes: creating a medium access control (MAC) entity for the target node.

In some embodiments, the performing the mobility procedure includes: establishing a radio link control (RLC) entity for a radio bearer in response to an RLC configuration per-radio bearer received in the RRC message.

In some embodiments, the performing the mobility procedure includes: generating a security context associated with the target node according to security parameters received in the RRC message.

In some embodiments, the performing the mobility procedure includes: keeping a security context of a packet data convergence protocol (PDCP) entity associated with the source node unchanged.

In some embodiments, the performing the mobility procedure includes: keeping the header compression context of a PDCP entity associated with the source node unchanged.

In some embodiments, the performing the mobility procedure includes: configuring a security context of a PDCP entity with a security context associated with the target node which is generated according to the security parameters received in the RRC message.

In some embodiments, the performing the mobility procedure includes: configuring a header compression context of a PDCP entity associated with the target node according to the header compression parameters configured for the PDCP entity which are received in the RRC message.

In some embodiments, the keeping the header compression context includes: keeping the header compression context of the PDCP entity associated with the source node that is associated with either a configured radio bearer; or keeping the header compression context of the PDCP entity associated with the source node that is associated with either a configured radio bearer which is configured with a simultaneous connectivity mobility indicator.

In some embodiments, the keeping the security context includes: keeping the security context of the PDCP entity associated with the source node that is associated with either a configured configured radio bearer; or keeping the security context of the PDCP entity associated with the source node that is associated with either a configured radio bearer which is configured with a simultaneous connectivity mobility indicator.

Another example method of wireless communication includes: receiving, at a wireless terminal, a radio resource control (RRC) message that includes an identifier of a target master cell group or an identifier of a target primary cell, or both; and performing, by the wireless terminal, a mobility procedure based on the RRC message.

In some embodiments, the RRC message includes the identifier of the target master cell group and wherein the performing the mobility procedure includes: begin using the target master cell group indicated by the identifier as a master cell group; and begin using the target primary cell of the target master cell group as a primary cell of the target master cell group.

In some embodiments, the RRC message includes the identifier of the target primary cell and wherein the performing the mobility procedure includes: begin using the target primary cell as a primary cell.

In some embodiments, the RRC message includes both an identifier of the target master cell group and the identifier of the target primary cell, and wherein the performing the mobility procedure includes: begin using the target master cell group as a master cell group; and begin using the target primary cell as a primary cell.

Another method of wireless communication includes: performing, by a wireless terminal that includes a packet data protocol convergence (PDCP) entity associated with both a source node and a target node, a security operation during a mobility procedure from the source node to the target node that includes one or more of: performing a first security operation including a receive security operation, or performing a second security operation including a transmitting security operation.

In some embodiments, the first security operation includes: performing deciphering and integrity verification using a first key associated with the source node for a PDCP packet data unit that is integrity protected and ciphered using the first key; and, in parallel, performing deciphering and integrity verification using a second key associated with the target node for a PDCP packet data unit that is integrity protected and ciphered using the second key.

In some embodiments, the first security operation includes: performing, after all PDCP protocol data units that are integrity protected and ciphered with a first key have finished their deciphering and integrity verification using the first key, deciphering and integrity verification, using a second key, for a PDCP protocol data unit that is integrity protected and ciphered with the second key.

In some embodiments, the second security operation includes: performing integrity protection and ciphering of PDCP service data units using a first key, until receiving an indication to use a second key or until the releasing of the source node.

In some embodiments, the second security operation includes: performing integrity protection and ciphering of PDCP service data units with a second key associated with the target node; and submitting a resulting PDCP protocol data unit to the RLC entity which is established on the target node.

In some embodiments, the second security operation includes: performing integrity protection and ciphering of PDCP service data units with a second key associated with the target node; and submitting a resulting protocol data unit to a radio link control entity established on the source node or the target node.

In some embodiments, the method further includes, in case that the wireless terminal includes a PDCP entity associated with a header compression context of both the source node and the target node, performing a header compression operation that includes:

performing header compression for PDCP service data units with a header compression context of the source node until receiving an indication to use a header compression context of the target node or until the releasing of the source node.

In some embodiments, the method further includes, in case that the wireless terminal includes a PDCP entity associated with a header compression context of both the source node and the target node, performing a header compression operation that includes:

performing header compression for PDCP service data units with the header compression context of the target node and submitting resulting PDCP protocol data unit to a radio link control entity on the target node.

In some embodiments, the method further includes, in case that the wireless terminal includes a PDCP entity associated with a header compression context of both the source node and the target node, performing a header compression operation that includes:

performing header compression for PDCP service data units with the header compression context of the target node and submitting resulting PDCP protocol data unit to a radio link control entity established on the source node or the target node.

Another method of wireless communication includes: transmitting, during handover of a wireless terminal from a source node to a target node, a message that includes one or more of: context reference information of the wireless terminal at the target node; or a per radio bearer basis simultaneous connectivity mobility indicator; or a context modification message that includes two sets of uplink transport layer information items per radio bearer.

In some embodiments, the method further includes receiving a context modification response that includes two sets of downlink transport information items per radio bearer.

In some embodiments, the method further includes including an indication that bearing packets are ciphered and integrity protected with a source key or a target key per downlink transport information item.

In some embodiments, a wireless communication apparatus comprising a processor configured to implement a method described herein.

In some embodiments, a computer readable medium having code stored thereon, may include processor-executable instructions to implement a method described herein.

It will be appreciated that many techniques for performing seamless and near zero millisecond disruption mobility of UEs are disclosed. The techniques may be embodied into UEs and network-side equipment such as base stations, gNBs and devices that operate as source nodes or target nodes for the mobility.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
   receiving, at a wireless terminal, from a source node, a radio resource control (RRC) message indicating whether to use a simultaneous connectivity mobility of the wireless terminal for each of a plurality of radio bearers during a mobility procedure from the source node to a target node until a connection to the source node is released,
      wherein the RRC message indicating use of the simultaneous connectivity mobility for a radio bearer from the plurality of radio bearers indicates keeping connections with both the source node and the target node;
   performing, by the wireless terminal, the mobility procedure based on the RRC message, wherein the performing the mobility procedure comprises:
      performing, by the wireless terminal, a handover from the source node to the target node;
      keeping, by the wireless terminal, connections with both the source node and the target node for the radio bearer until the connection to the source node is released, wherein the wireless terminal includes a packet data protocol convergence (PDCP) entity associated with both the source node and the target node, wherein the PDCP entity is associated with the radio bearer, and wherein the radio bearer is configured with a simultaneous connectivity mobility indicator;
      keeping a header compression context of the PDCP entity associated with the source node unchanged; and
      configuring the header compression context of the PDCP entity associated with the target node according to header compression parameters configured for the PDCP entity, wherein the header compression parameters are received in the RRC message.

2. The method of claim 1,
   keeping a security context of the PDCP entity associated with the source node unchanged.

3. The method of claim 1, wherein the performing the mobility procedure includes:
   configuring a security context of the PDCP entity with a security context associated with the target node which is generated according to security parameters received in the RRC message.

4. The method of claim 1, wherein the performing the mobility procedure includes:
   creating a medium access control (MAC) entity for the target node.

5. The method of claim 1,
   wherein the wireless terminal performs a security operation during the mobility procedure from the source node to the target node that includes one or more of:
   performing a first security operation including a receive security operation, or
   performing a second security operation including a transmitting security operation.

6. The method of claim 5, wherein the first security operation includes:
   performing deciphering and integrity verification using a first key associated with the source node for a PDCP packet data unit that is integrity protected and ciphered using the first key; and,
   performing deciphering and integrity verification using a second key associated with the target node for a PDCP packet data unit that is integrity protected and ciphered using the second key.

7. The method of claim 5, wherein the second security operation includes:
   performing integrity protection and ciphering of PDCP service data units using a first key, until receiving an indication to use a second key.

8. The method of claim 5, further including: performing by the wireless terminal a header compression operation that includes:
   performing header compression for PDCP service data units with the header compression context of the source node until receiving an indication to use a header compression context of the target node.

9. The method of claim 1,
   wherein the wireless terminal includes a transmit packet data convergence protocol (PDCP) entity and a receive PDCP entity, wherein the transmit PDCP entity includes a first part that includes only a sequence numbering and a second part that includes a header compression, an integrity protection, and ciphering, and wherein the receive PDCP entity includes a first part that includes a reordering and a second part that includes a header decompression, an integrity verification, and a deciphering.

10. A wireless communication apparatus comprising a processor configured to implement a method, the processing configured to:

receive, at a wireless terminal, from a source node, a radio resource control (RRC) message indicating whether to use a simultaneous connectivity mobility of the wireless terminal for each of a plurality of radio bearers during a mobility procedure from the source node to a target node until a connection to the source node is released, wherein the RRC message indicating use of the simultaneous connectivity mobility for a radio bearer from the plurality of radio bearers indicates keeping connections with both the source node and the target node;

perform, by the wireless terminal, the mobility procedure based on the RRC message, wherein the perform the mobility procedure comprises:

perform, by the wireless terminal, a handover from the source node to the target node;

keep, by the wireless terminal, connections with both the source node and the target node for the radio bearer until the connection to the source node is released, wherein the wireless terminal includes a packet data protocol convergence (PDCP) entity associated with both the source node and the target node, wherein the PDCP entity is associated with the radio bearer, and wherein the radio bearer is configured with a simultaneous connectivity mobility indicator;

keep a header compression context of the PDCP entity associated with the source node unchanged; and configure the header compression context of the PDCP entity associated with the target node according to header compression parameters configured for the PDCP entity, wherein the header compression parameters are received in the RRC message.

11. The wireless communication apparatus of claim 10, keep a security context of the PDCP entity associated with the source node unchanged.

12. The wireless communication apparatus of claim 10, wherein the processor is configured to perform the mobility procedure by being configured to:

configure a security context of the PDCP entity with a security context associated with the target node which is generated according to security parameters received in the RRC message.

13. The wireless communication apparatus of claim 10, wherein the mobility procedure is performed by the processor configured to:

create a medium access control (MAC) entity for the target node.

14. The wireless communication apparatus of claim 10, wherein the wireless terminal is configured to performs a security operation during the mobility procedure from the source node to the target node that includes one or more of:

perform a first security operation including a receive security operation, or perform a second security operation including a transmitting security operation.

15. The wireless communication apparatus of claim 14, wherein the first security operation includes:

performing deciphering and integrity verification using a first key associated with the source node for a PDCP packet data unit that is integrity protected and ciphered using the first key; and, performing deciphering and integrity verification using a second key associated with the target node for a PDCP packet data unit that is integrity protected and ciphered using the second key.

16. The wireless communication apparatus of claim 14, wherein the second security operation is performed by the processor configured to:

perform integrity protection and ciphering of PDCP service data units using a first key, until receiving an indication to use a second key.

17. The wireless communication apparatus of claim 14, wherein the processor is further configured to perform by the wireless terminal a header compression operation that includes:

perform header compression for PDCP service data units with the header compression context of the source node until receiving an indication to use a header compression context of the target node.

18. The wireless communication apparatus of claim 10, wherein the wireless terminal includes a transmit packet data convergence protocol (PDCP) entity and a receive PDCP entity, wherein the transmit PDCP entity includes a first part that includes only a sequence numbering and a second part that includes a header compression, an integrity protection, and ciphering, and wherein the receive PDCP entity includes a first part that includes a reordering and a second part that includes a header decompression, an integrity verification, and a deciphering.

* * * * *